(12) United States Patent
Clynne (10) Patent No.: US 10,474,148 B2
(45) Date of Patent: Nov. 12, 2019

(54) NAVIGATING AN UNMANNED AERIAL VEHICLE

(71) Applicant: GE Aviation Systems LLC, Grand Rapids, MI (US)

(72) Inventor: Thomas Clynne, East Cleveland, OH (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 15/220,729

(22) Filed: Jul. 27, 2016

(65) Prior Publication Data
US 2018/0032074 A1 Feb. 1, 2018

(51) Int. Cl.
*G05D 1/00* (2006.01)
*G06T 7/70* (2017.01)
(Continued)

(52) U.S. Cl.
CPC ......... *G05D 1/0088* (2013.01); *B64C 39/024* (2013.01); *G01C 21/165* (2013.01); *G01C 21/20* (2013.01); *G05D 1/101* (2013.01); *G06T 5/003* (2013.01); *G06T 7/70* (2017.01); *G08G 5/0021* (2013.01); *G08G 5/0069* (2013.01); *G08G 5/04* (2013.01); *G08G 5/045* (2013.01); *H04N 7/181* (2013.01); *B64C 2201/123* (2013.01); *B64C 2201/141* (2013.01);
(Continued)

(58) Field of Classification Search
CPC .................................................... G05D 1/0088
USPC ............................................................. 701/3
See application file for complete search history.

(56) References Cited

U.S. PATENT DOCUMENTS 4,805,015 A 2/1989 Copeland
5,581,250 A 12/1996 Khvilivitzky
(Continued)

FOREIGN PATENT DOCUMENTS

CN 103984357 A 8/2014
EP 0 436 213 A2 7/1991
WO 2015/085483 A1 6/2015

OTHER PUBLICATIONS

Extended European Search Report and Opinion issued in connection with corresponding EP Application No. 17182958.3 dated Dec. 14, 2017.
(Continued)

*Primary Examiner* — Jean Paul Cass
(74) *Attorney, Agent, or Firm* — Dority & Manning, P.A.

(57) ABSTRACT

Systems and methods for navigating an unmanned aerial vehicle are provided. One example aspect of the present disclosure is directed to a method for navigating an unmanned aerial vehicle. The method includes capturing, by one or more processors associated with a flight management system of an unmanned aerial vehicle, one or more images. The method includes assessing, by the one or more processors, signals from an inertial measurement unit (IMU). The method includes processing, by the one or more processors, the one or more captured images based on the assessed signals to generate one or more corrected images. The method includes processing, by the one or more processors, the one or more generated corrected images to approximate position data. The method includes causing, by the one or more processors, the unmanned aerial vehicle to be controlled based on the position data.

10 Claims, 6 Drawing Sheets

(51) Int. Cl.
  *G05D 1/10* (2006.01)
  *G08G 5/04* (2006.01)
  *H04N 7/18* (2006.01)
  *G01C 21/16* (2006.01)
  *G01C 21/20* (2006.01)
  *G06T 5/00* (2006.01)
  *G08G 5/00* (2006.01)
  *B64C 39/02* (2006.01)

(52) U.S. Cl.
  CPC ............... *G06T 2207/10032* (2013.01); *G06T 2207/20201* (2013.01); *G06T 2207/30181* (2013.01)

(56) References Cited

U.S. PATENT DOCUMENTS

| | | | |
|---|---|---|---|
| 8,350,894 B2 | 1/2013 | Turner et al. | |
| 8,712,608 B2 | 4/2014 | Pepicelli et al. | |
| 8,885,059 B1* | 11/2014 | Venkataraman | H01L 27/14618 348/218.1 |
| 9,664,516 B2* | 5/2017 | Song | G01C 19/04 |
| 9,725,091 B2* | 8/2017 | Dempsey | B60W 30/146 |
| 9,736,368 B2* | 8/2017 | Lablans | H04N 5/247 |
| 2005/0058321 A1* | 3/2005 | Buehler | G06K 9/00771 382/103 |
| 2006/0159369 A1* | 7/2006 | Young | G06T 3/4069 382/299 |
| 2006/0238441 A1 | 10/2006 | Benjamin et al. | |
| 2008/0035789 A1* | 2/2008 | Lewis | G05D 1/0055 244/1 R |
| 2009/0326816 A1* | 12/2009 | Park | G01C 21/165 701/501 |
| 2010/0042273 A1* | 2/2010 | Meunier | G01C 23/005 701/9 |
| 2011/0213664 A1* | 9/2011 | Osterhout | G02B 27/017 705/14.58 |
| 2011/0214082 A1* | 9/2011 | Osterhout | G02B 27/017 715/773 |
| 2012/0075168 A1* | 3/2012 | Osterhout | G02B 27/017 345/8 |
| 2012/0194418 A1* | 8/2012 | Osterhout | G02B 27/0093 345/156 |
| 2014/0022051 A1* | 1/2014 | Levien | G05D 1/0011 340/5.2 |
| 2014/0240529 A1* | 8/2014 | Venkataraman | H04N 5/2252 348/218.1 |
| 2015/0077516 A1 | 3/2015 | Coto-Lopez | |
| 2016/0052619 A1* | 2/2016 | Gagliano | B64C 39/04 244/13 |
| 2016/0297522 A1* | 10/2016 | Brulez | B64C 39/024 |
| 2017/0123063 A1* | 5/2017 | Yamashita | G01S 17/023 |
| 2017/0176188 A1* | 6/2017 | Georgy | G01C 21/005 |
| 2017/0243330 A1* | 8/2017 | Stec | G06T 5/003 |

OTHER PUBLICATIONS

Depth Estimation From Stereo Video, MathWorks, https://www.mathworks.com/help/vision/examples/depth-estimation-from-stereo-video.html.

Nalpantidis, Lazaros & Gasteratos, Antonios. (2011). Stereo Vision Depth Estimation Methods for Robotic Applications. Depth Map and 3D Imaging Applications: Algorithms and Technologies. 3. 397-417. 10.4018/978-1-61350-326-3.ch021.

Saxena, Ashutosh & Schulte, Jamie & Y. Ng, Andrew. (2007). Depth Estimation Using Monocular and Stereo Cues.. IJCAI International Joint Conference on Artificial Intelligence. 2197-2203.

Borenstein, J., & Koren, Y. (1990). Real-time obstacle avoidance for fast mobile robots in cluttered environments. IEEE Transactions on Systems, Man, and Cybernetics, 19(5), 1179-1187. doi:10.1109/21.44033.

* cited by examiner

NAVIGATING AN UNMANNED AERIAL VEHICLE

FIELD

The present subject matter relates generally to unmanned aerial vehicles.

BACKGROUND

Unmanned aerial vehicles are increasingly used for a variety of purposes. An unmanned aerial vehicle can use a flight management system that controls a flight path of the unmanned aerial vehicle without requiring a person to be physically present on the aerial vehicle to fly the aerial vehicle. An unmanned aerial vehicle can be controlled to follow a flight path. Obstacles can obstruct the flight path. In a manned aerial vehicle, a pilot can deviate from a flight path to avoid the obstacles. However, in an unmanned aerial vehicle, a pilot may not be available to aid in avoiding the obstacles.

BRIEF DESCRIPTION

Aspects and advantages of embodiments of the present disclosure will be set forth in part in the following description, or may be learned from the description, or may be learned through practice of the embodiments.

One example aspect of the present disclosure is directed to a method for navigating an unmanned aerial vehicle. The method includes capturing, by one or more processors associated with a flight management system of an unmanned aerial vehicle, one or more images. The method includes assessing, by the one or more processors, signals from an inertial measurement unit (IMU). The method includes processing, by the one or more processors, the one or more captured images based on the assessed signals to generate one or more corrected images. The method includes processing, by the one or more processors, the one or more generated corrected images to approximate position data. The method includes causing, by the one or more processors, the unmanned aerial vehicle to be controlled based on the position data.

Another example aspect of the present disclosure is directed to a system for navigating an unmanned aerial vehicle. The system includes a first optical device. The system includes a first inertial measurement unit (IMU) associated with the first optical device. The system includes a second optical device. The system includes a second IMU associated with the second optical device. The system includes one or more memory devices. The system includes one or more processors. The one or more processors are configured to receive a first image from the first optical device at a first time. The one or more processors are configured to receive a second image from the second optical device at the first time. The one or more processors are configured to receive a first signal from the first IMU. The one or more processors are configured to receive a second signal from the second IMU. The one or more processors are configured to process the first image based on the first signal to a first corrected image. The one or more processors are configured to process the second image based on the second signal to a second corrected image. The one or more processors are configured to process the first corrected image and the second corrected image to approximate position data. The one or more processors are configured to cause the unmanned aerial vehicle to be controlled based on the position data.

Other example aspects of the present disclosure are directed to systems, methods, aircrafts, avionics systems, devices, non-transitory computer-readable media for navigating an unmanned aerial vehicle. Variations and modifications can be made to these example aspects of the present disclosure.

These and other features, aspects and advantages of various embodiments will become better understood with reference to the following description and appended claims. The accompanying drawings, which are incorporated in and constitute a part of this specification, illustrate embodiments of the present disclosure and, together with the description, serve to explain the related principles.

BRIEF DESCRIPTION OF THE DRAWINGS

Detailed discussion of embodiments directed to one of ordinary skill in the art are set forth in the specification, which makes reference to the appended figures, in which.

DETAILED DESCRIPTION

Reference now will be made in detail to embodiments, one or more examples of which are illustrated in the drawings. Each example is provided by way of explanation of the embodiments, not limitation of the embodiments. In fact, it will be apparent to those skilled in the art that various modifications and variations can be made in the present disclosure without departing from the scope or spirit of the invention. For instance, features illustrated or described as part of one embodiment can be used with another embodiment to yield a still further embodiment. Thus, it is intended that the present disclosure covers such modifications and variations as come within the scope of the appended claims and their equivalents.

As used in the specification and the appended claims, the singular forms "a," "an," and "the" include plural referents unless the context clearly dictates otherwise. The use of the term "about" in conjunction with a numerical value refers to within 25% of the started amount.

Example aspects of the present disclosure are directed to methods and systems that can allow an unmanned aerial vehicle to navigate around obstacles. The unmanned aerial vehicle can include a plurality of optical devices (e.g., cameras, etc.) to capture one or more images. In an embodiment, the one or more images can include a video stream. The one or more images can show (e.g., illustrate, demonstrate, etc.) an obstacle (e.g., an obstacle, etc.). The unmanned aerial vehicle can include an inertial measurement unit (IMU) to produce signals related to movement of the unmanned aerial vehicle. The IMU can include and/or can be in communication with a microelectromechanical systems (MEMS) gyroscopes and/or accelerometers.

The unmanned aerial vehicle can include one or more processors. The one or more processors can be configured to correct (e.g., fix, stabilize, de-blur, etc.) the one or more images using the produced signals to generate corrected images. A corrected image can include an image that has been processed to improve to improve the ability to the process the image to determine approximate image data. For instance, a corrected image can include image that has been processed for instance, to have blur reduced.

Position data of an obstacle can be approximated from the corrected images. For example, position data of the obstacle relative to the unmanned aerial vehicle can be approximated using a first field of view (FOV) associated with a first optical device, a first resolution associated with the first optical device, a second field of view (FOV) associated with a second optical device, a second resolution associated with the second optical device, and a distance of the first optical device from the second optical device.

Position data of the obstacle can be approximated at a plurality of times. A path of the obstacle can be estimated using the position data. Velocity of the obstacle can be estimated using the position data. Acceleration of the obstacle can be estimated using the position data. If the estimated path, velocity, and/or acceleration indicate that the unmanned aerial vehicle could collide with the obstacle, then the unmanned aerial vehicle can be caused to avoid the obstacle. Once the unmanned aerial vehicle has avoided the obstacle, the unmanned aerial vehicle can be caused to return to a flight path. In this way, the systems and methods according to example aspects of the present disclosure have a technical effect of enabling an unmanned aerial vehicle to automatically avoid obstacles.

Figure 1:
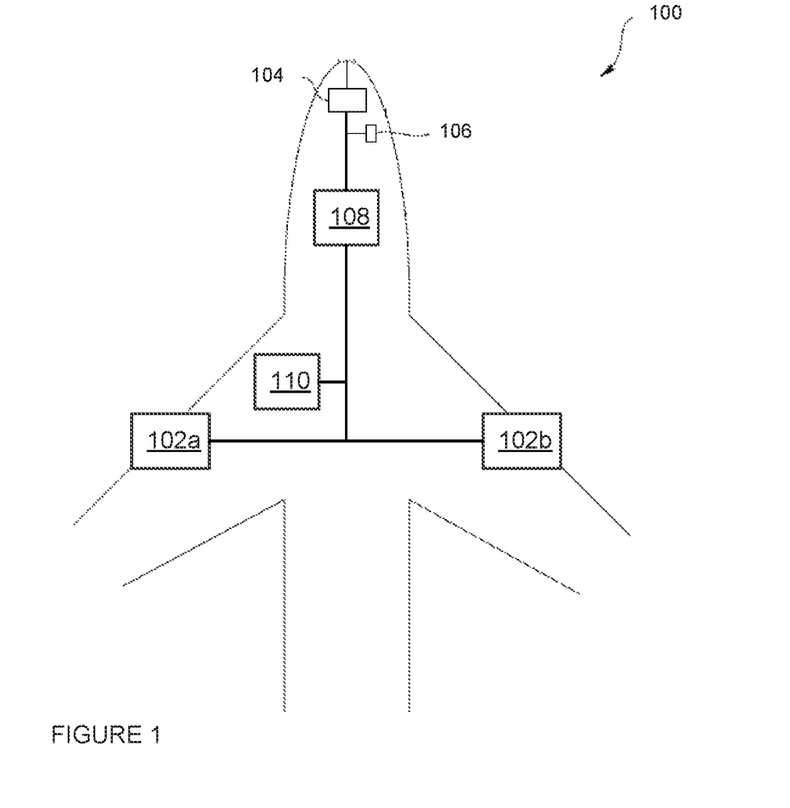
FIG. 1 depicts an unmanned aerial vehicle including an example navigation system.

FIG. 1 is a Vehicle 100 such as an unmanned aerial vehicle in accordance with an embodiment of the present disclosure. The vehicle 100 includes two or more optical devices (e.a., cameras, etc.) 102a-b, a flight management system (FMS) 104 for generating a flight path trajectory and flying vehicle 100 along the flight path trajectory, a maneuvering system 106, one or more processors 108, an inertial measurement unit (IMU) 110, and a plurality of other systems and subsystems that enable proper operation of vehicle 100. The one or more optical devices 102a-b can capture still images. The one or more optical devices 102a-b can capture a video stream. The optical devices 102a-b can be included on wings of the vehicle 100. Each optical device 102a on a left wing assembly of the vehicle 100 can have a corresponding optical device 102b on a right wing assembly of the vehicle 100. Each optical device 102a on a left wing assembly of the vehicle 100 can be an equal distance to a center of the vehicle 100 as a corresponding optical device 102b on a right wing assembly of the vehicle 100. Each optical device 102a on a left wing assembly of the vehicle 100 can capture an image at a same time that a corresponding optical device 102b on a right wing assembly of the vehicle 100 captures a corresponding image.

The FMS 104 can include the modeling system or be in communication with the modeling system in, for instance, the one or more processors 108. The FMS 104 and/or the modeling system can include a navigation system or be in communication with the navigation system. The navigation system will be described in more detail in reference to FIG. 5. The navigation system can be implemented by the one or more processors 108. The FMS 104, the modeling system, and/or the navigation system can be stored in memory and executed by one or more computing device(s), as shown in FIG. 6.

The FMS 104 can create a flight path for the vehicle 100 based on a destination and a current location. In an embodiment, the FMS 104 can work in conjunction with the maneuvering system 106 to cause the vehicle 100 to move. In one embodiment, the maneuvering system 106 can be in communication with one or more ailerons, a rudder, an elevator, an inverted V-tail assembly, one or more rotors. etc. For example, the maneuvering system 106 can alter an inverted V-tail assembly to cause the vehicle 100 to move along an x-axis, or roll-axis (e.g., roll clockwise, roll counterclockwise). In another embodiment, the maneuvering system 106 can cause one or more ailerons of one or more wing assemblies to deflect, resulting in the vehicle 100 rolling clockwise or counterclockwise. In another example, the maneuvering system 106 can alter an inverted V-tail assembly to cause the vehicle 100 to move along a y-axis, or yaw-axis (e.g., turn left, turn right). In another embodiment, the maneuvering system 106 can cause a rudder of a tail assembly to deflect, resulting in the vehicle 100 turning left or right. In yet another example, the maneuvering system 106 can alter an inverted V-tail assembly to cause the vehicle 100 to move along a z-axis, or pitch-axis (e.g., increase elevation or decrease elevation). In another embodiment, the maneuvering system 106 can cause an elevator of a tail assembly to deflect, resulting in the vehicle 100 increasing elevation or decreasing elevation. In other embodiments, the maneuvering system 106 can cause the vehicle 100 to move along the roll-axis, the yaw-axis, and/or the pitch axis by causing rotors to change angles and/or output.

The inertial measurement unit (IMU) 110 can produce one or more signals related to movement of the unmanned aerial vehicle. The IMU 110 can include and/or can be in communication with a microelectromechanical systems (MEMS) gyroscopes and/or accelerometers. The one or more signals produced by the IMU 110 can be used to correct one or more images received from the plurality of optical devices 102a-b. The one or more processors 108 can receive the captured images from the plurality of optical devices 102a-b and the one or more signals produced by the IMU 110. The one or more processors 108 can determine position data of an obstacle using the captured images and the one or more produced signals. The one or more processors 108 can FMS 104 and/or the maneuvering system 106 to cause the unmanned aerial vehicle 100 to avoid the obstacle.

The numbers, locations, and/or orientations of the components of example vehicle 100 are for purposes of illustration and discussion and are not intended to be limiting. Those of ordinary skill in the art, using the disclosures provided herein, shall understand that the numbers, locations, and/or orientations of the components of the vehicle 100 can be adjusted without deviating from the scope of the present disclosure.

Figure 2:
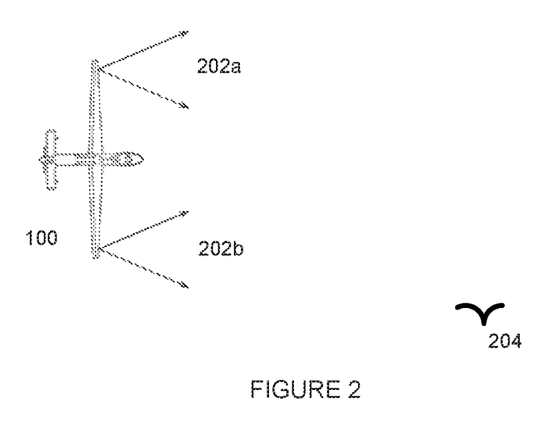
FIG. 2 depicts a diagram including an example navigation system.

FIG. 2 depicts a diagram including an example navigating system. The vehicle 100 can detect a possible obstacle 204 using a first captured image 202a taken from a first optical device 102a and a second captured image 202b taken from a second optical device 102b. A first field of view of a first lens associated with the first optical device 102a at a first time when the first captured image 202a is captured can be recorded. A first resolution associated with the first captured image 202a can be recorded. A second field of view of a second lens associated with the second optical device 102a at the first time when the second captured image 202b is captured can be recorded. A second resolution associated with the second captured image 202b can be recorded. A distance from the vehicle 100 to the possible obstacle 204 can be estimated using the first field of view, the first resolution, the second field of view, the second resolution, and a distance from the first optical device 102a to the second optical device 102b. A two-dimensional plane including both the vehicle 100 and the possible obstacle can be determined using one or more pixels of the first captured image 202a and one or more pixels of the second captured image 202b.

Figure 3:
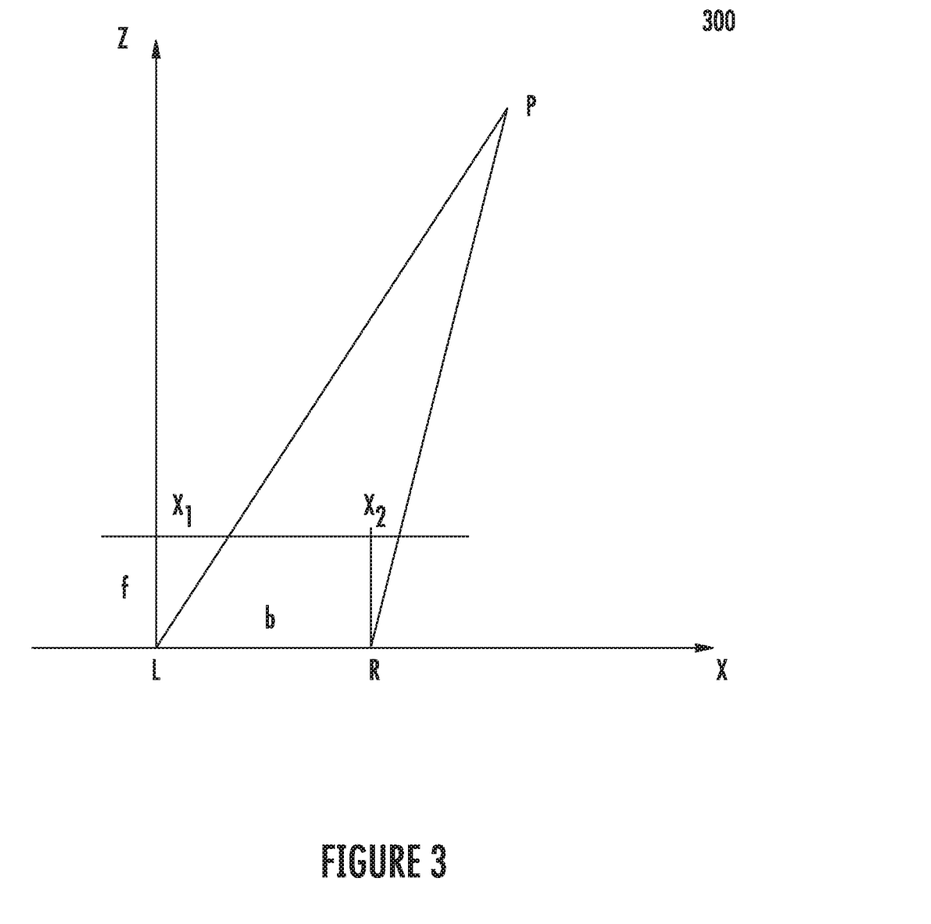
FIG. 3 depicts an example graph.

FIG. 3 depicts an example graph 300, "L" in the graph 300 can represent a position of the first optical device 102a. "R" in the graph 300 can represent a position of the second optical device 102b. "b" in the graph 300 can represent a distance between the first optical device 102a and the second optical device 102b. The graph 300 can use the first determined distance, the second determined distance, a distance between the first optical device 102a and the second optical device 102b, and the two-dimensional plane to create the graph 300. "P" in the graph 300 can represent a position of the possible obstacle 204 in the two-dimensional plane.

Figure 4:
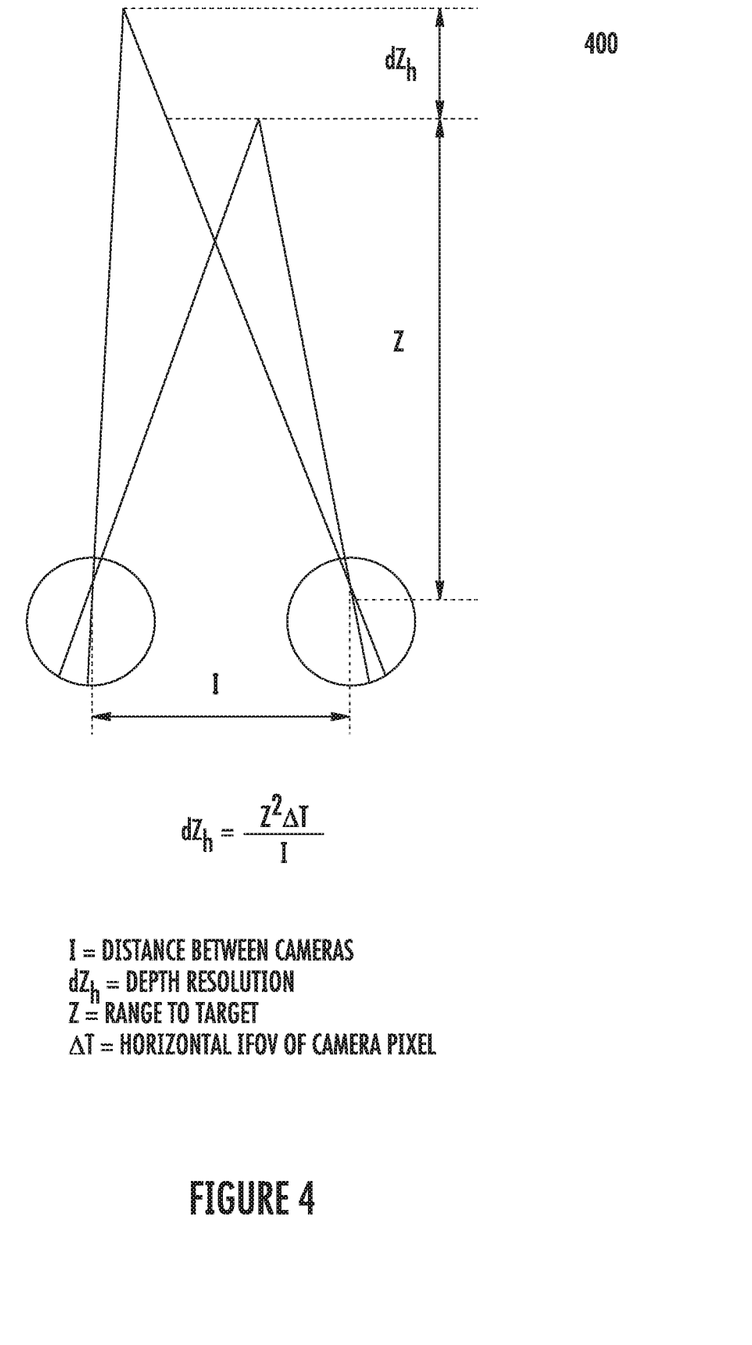
FIG. 4 depicts an example equation according to example embodiments of the present disclosure.

FIG. 4 depicts an example equation 400 according to example embodiments of the present disclosure. A horizontal field of view (FOV) of an image can be determined by measuring an amount of an available FOV of a lens by a number of pixels in a given direction. An instantaneous field of view (IFOV) for an image can be an amount of angular arc subtended by each pixel of the image. In an embodiment, the IFOV can be calculated by dividing the determined horizontal FOV by the number of pixels in one direction of the image.

In an embodiment, pattern matching between an object in two images taken simultaneously can be used to determine a distance from the object to the unmanned aerial vehicle. A comparison of two images taken simultaneously can be called a frame by frame comparison. A frame by frame comparison can reveal a pixel shift in one image as compared to the other image. For example, if an object found in both images shifts right in the right most optical device by three pixels as compared to the left most optical device, then a distance from a center of the unmanned aerial vehicle can be calculated as three times a minimum depth resolution as given by the left most optical device and the right most optical device. In another example, a first frame by frame comparison can reveal a one pixel shift, and a second frame by frame comparison can reveal a two pixel shift. The change in pixel shift in the two frame by frame comparisons can be used with a known speed of the unmanned aerial vehicle and the equation 400 to determine range.

Figure 5:
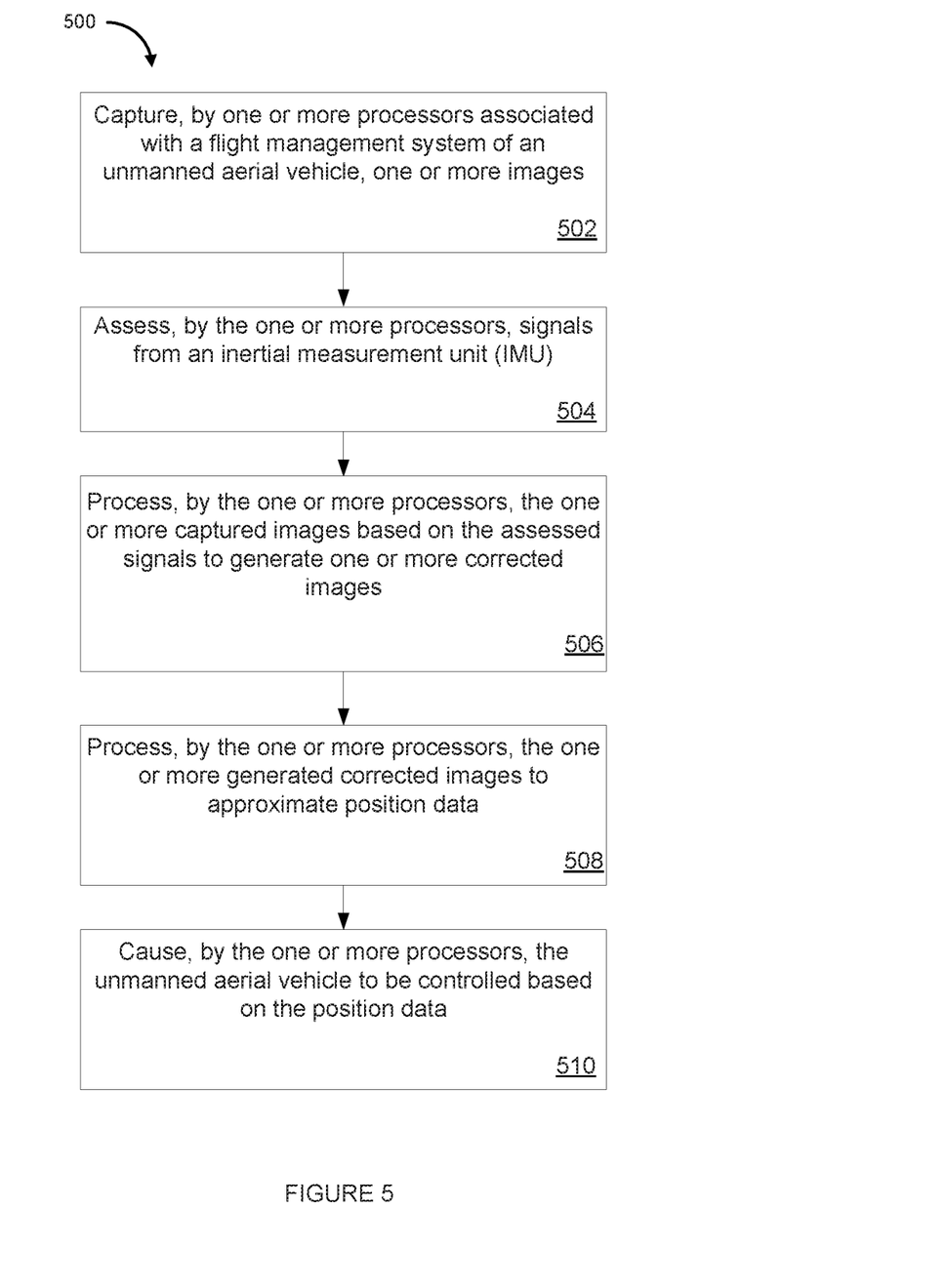
FIG. 5 depicts a flow diagram of an example method according to example embodiments of the present disclosure.
Figure 6:
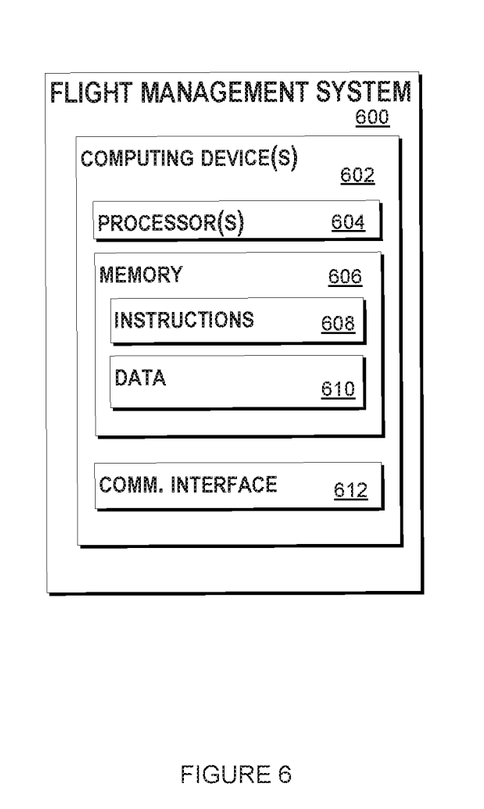
FIG. 6 depicts a computing system for implementing one or more aspects according to example embodiments of the present disclosure.

FIG. 5 depicts a flow diagram of an example method (500) for navigating an unmanned aerial vehicle. The method of FIG. 5 can be implemented using, for instance, the one or more computing device(s) 602 of FIG. 6. FIG. 5 depicts steps performed in a particular order for purposes of illustration and discussion. Those of ordinary skill in the art, using the disclosures provided herein, will understand that various steps of any of the methods disclosed herein can be adapted, modified, rearranged, or modified in various ways without deviating from the scope of the present disclosure.

At (502), one or more images can be captured. For instance, the one or more images can be captured by one or more optical devices 102a-b. In an embodiment, a first image can be captured by a first optical device at a first time. In a further embodiment, a second image can be captured by a second optical device at the first time. In an embodiment, the first optical device can be situated a predetermined distance from the second optical device. In an embodiment, the first optical device can be situated one half of the predetermined distance from a center point of the unmanned aerial vehicle. In an embodiment, the second optical device can be situated one half of the predetermined distance from the center point of the unmanned aerial vehicle. In an embodiment, the first optical device can capture a first video stream. In a further embodiment, the second optical device can capture a second video stream. Optionally, a third image can be captured by the first optical device at a second time. Optionally, a fourth image can be captured by the second optical device at the second time. Optionally, a fifth image can be captured by the first optical device at a third time. Optionally, a sixth image can be captured by the second optical device at the third time. A pair of images can be captured by the first optical device and the second optical device at any number of times.

At (504), signals can be assessed from an inertial measurement unit (IMU). For instance, the one or more processors 108 can assess signals from an IMU. The IMU can include an accelerometer. The IMU can include a microelectromechanical systems (MEMS) gyroscope. At (506), the one or more captured images can be processed based on the assessed signals to generate one or more corrected images. A corrected image can include an image that has been processed to improve to improve the ability to the process the image to determine approximate image data. For instance, a corrected image can include image that has been processed for instance, to have blur reduced. In some embodiments, the one or more processors 108 can process the one or more captured images based on the assessed signals to generate one or more corrected images.

At (508), the one or more generated corrected images can be processed to approximate position data. For instance, the one or more processors 108 can process the one or more generated corrected images to approximate position data. In an embodiment, a known first field of view of a first lens associated with the first optical device can be received. In a further embodiment, a known first resolution associated with the first image can be received. In a further embodiment, a known second field of view of a second lens associated with the second optical device can be received. In a further embodiment, a known second resolution associated with the second image can be received. In a further embodiment, a distance of the obstacle to the unmanned aerial vehicle can be estimated based, at least in part, on the predetermined distance, the known first field of view, the known first resolution, and the known second field of view, and the known second resolution. In another embodiment, a known first instantaneous field of view (IFOV) associated with the first optical device can be had. In a further embodiment, a known second instantaneous field of view (IFOV) associated with the second optical device can be had. In a further embodiment, a distance of the obstacle to the unmanned aerial vehicle can be estimated based, at least in part, on the predetermined distance, the first IFOV, and the second IFOV. In another embodiment, a first position of an obstacle can be estimated at the first time. In a further embodiment, a second position of the obstacle can be estimated at the second time. In another embodiment, a velocity of the obstacle can be estimated based on a difference between the first position and the second position and a difference between the first time and the second time. In another embodiment, a third position of an obstacle at the third time can be estimated. In a further embodiment, a second velocity of the obstacle can be estimated based on a difference between the second position and the third position and a difference between the second time and the third time. In another embodiment, an acceleration of the obstacle can be estimated based, at least in part, on the first estimated velocity and the second estimated velocity.

Optionally, one or more pixel rows in the first image and one or more pixel rows in the second image can be used to estimate an elevation of the possible obstacle at the first time. Optionally, one or more pixel rows in the third image and one or more pixel rows in the fourth image can be used to estimate an elevation of the possible obstacle at the second time. The estimated elevation of the possible obstacle at the first time and the estimated elevation of the possible obstacle at the second time can be used to estimate an elevation movement of the possible obstacle.

Optionally, one or more pixel columns in the first image and one or more pixel columns in the second image can be used to estimate a horizontal position of the possible obstacle at the first time. Optionally, one or more pixel rows in the third image and one or more pixel rows in the fourth image can be used to estimate a horizontal position of the possible obstacle at the second. The estimated horizontal position of the possible obstacle at the first time and the estimated horizontal position of the possible obstacle at the second time can be used to estimate a horizontal movement of the possible obstacle.

At (510), the unmanned aerial vehicle can be caused to be controlled based on the position data. For instance, the FMS 104 and/or the maneuvering system 106 can control the unmanned aerial vehicle based on the position data. In an embodiment, an avoidance maneuver can be performed. In a further embodiment, the unmanned aerial vehicle can return to a planned course after performing the avoidance maneuver.

FIG. 6 depicts a block diagram of an example computing system that can be used to implement the flight management system 600 or other systems of the aircraft according to example embodiments of the present disclosure. As shown, the flight management system 600 can include one or more computing device(s) 602. The one or more computing device(s) 602 can include one or more processor(s) 604 and one or more memory device(s) 606. The one or more processor(s) 604 can include any suitable processing device, such as a microprocessor, microcontroller, integrated circuit, logic device, or other suitable processing device. The one or more memory device(s) 606 can include one or more computer-readable media, including, but not limited to, non-transitory computer-readable media, RAM, ROM, hard drives, flash drives, or other memory devices.

The one or more memory device(s) 606 can store information accessible by the one or more processor(s) 604, including computer-readable instructions 608 that can be executed by the one or more processor(s) 604. The instructions 608 can be any set of instructions that when executed by the one or more processor(s) 604 cause the one or more processor(s) 604 to perform operations. The instructions 608 can be software written in any suitable programming language or can be implemented in hardware. In some embodiments, the instructions 608 can be executed by the one or more processor(s) 604 to cause the one or more processor(s) 604 to perform operations, such as the operations for navigating an unmanned aerial vehicle, as described with reference to FIG. 5, and/or any other operations or functions of the one or more computing device(s) 602.

The memory device(s) 606 can further store data 610 that can be accessed by the processors 604. For example, the data 610 can include a navigational database, data associated with the navigation system(s), data associated with the control mechanisms, data indicative of a flight plan associated with the vehicle 100, data associated with cooperative sensors, non-cooperative sensors, and/or any other data associated with vehicle 100, as described herein. The data 610 can include one or more table(s), function(s), algorithm(s), model(s), equation(s), etc. for navigating the vehicle 100 according to example embodiments of the present disclosure.

The one or more computing device(s) 602 can also include a communication interface 612 used to communicate, for example, with the other components of system. The communication interface 612 can include any suitable components for interfacing with one or more network(s), including for example, transmitters, receivers, ports, controllers, antennas, or other suitable components, Although specific features of various embodiments may be shown in some drawings and not in others, this is for convenience only. In accordance with the principles of the present disclosure, any feature of a drawing may be referenced and/or claimed in combination with any feature of any other drawing.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A method for controlling an unmanned aerial vehicle comprising:

capturing, by one or more processors associated with a flight management system of the unmanned aerial vehicle, more than one images, the capturing further comprising:

capturing a first image by a first optical device at a first time, the first image including an obstacle: and capturing a second image by a second optical device at the first time, the second image including the obstacle, and the second optical device being situated a predetermined distance from the first optical device:

assessing, by the one or more processors, signals from an inertial measurement unit (TM U);

processing, by the one or more processors, the more than one images based on the assessed signals to generate one or more corrected images:

processing, by the one or more processors, the more than one generated corrected images to approximate a distance between the obstacle and the unmanned aerial vehicle, and causing, by the one or more processors, the unmanned aerial vehicle to be controlled based on the approximated distance between the obstacle and the unmanned aerial vehicle, wherein processing to approximate the distance between the obstacle and the unmanned aerial vehicle is based, at least in part, on the predetermined distance and a pixel shift between the obstacle as included in the first image and the obstacle as included in the second image;

capturing a third image by the first optical device at a second time; and capturing a fourth image by the second optical device at the second time,
estimating a first position of the obstacle at the first time;
estimating a second position of the obstacle at the second time;
estimating a velocity of the obstacle based on a difference between the first position and the second position and a difference between the first time and the second time;
capturing a fifth image by the first optical device at a third time;
capturing a sixth image by the second optical device at the third time;
estimating a third position of the obstacle at the third time;
estimating a second velocity of the obstacle based on a difference between the second position and the third position and a difference between the second time and the third time; and
estimating an acceleration of the obstacle based, at least in part, on the first estimated velocity and the second estimated velocity, wherein processing the one or more captured images comprises stabilizing the one or more captured images.

2. The method of claim 1, wherein the first optical device captures a first video stream, and wherein the second optical device captures a second video stream.

3. The method of claim 1, wherein the IMU comprises an accelerometer, and wherein processing the one or more images comprises reducing blur.

4. The method of claim 1, wherein the IMU comprises a microelectromechanical systems (MEMS) gyroscope.

5. The method of claim 1, further including controlling the unmanned aerial vehicle based on the distance between the obstacle and the unmanned aerial vehicle, and wherein the controlling comprises causing, by the processor, the unmanned aerial vehicle to perform an avoidance maneuver.

6. The method of claim 1, wherein estimating the distance between the obstacle and the unmanned aerial vehicle is further based on an instantaneous field of view (IFOV) associated with the first optical device.

7. The method of claim 1, wherein estimating the distance between the obstacle and the unmanned aerial vehicle is further based on an instantaneous field of view (IFOV) associated with the second optical device.

8. The method of claim 6, wherein the instantaneous field of view includes an amount of angular arc subtended by each pixel of the one or more images.

9. The method of claim 7, wherein the instantaneous field of view includes an amount of angular arc subtended by each pixel of the one or more images.

10. The method of claim 5, further comprising causing, by the processor, the unmanned aerial vehicle to return to a planned course after performing the avoidance maneuver.

* * * * *